United States Patent [19]

Lee et al.

[11] Patent Number: 5,781,329
[45] Date of Patent: Jul. 14, 1998

[54] ELECTROCHROMIC DISPLAY DEVICE FOR OPTICAL PICK UP APPARATUS

[75] Inventors: Man Hyung Lee; Kyung Chan Park, both of Seoul; Yoon Kwon Lee, Kyungki-Do; Byung Gil Ryu, Seoul, all of Rep. of Korea

[73] Assignee: LG Electronics Inc., Seoul, Rep. of Korea

[21] Appl. No.: 770,273

[22] Filed: Dec. 20, 1996

[30] Foreign Application Priority Data

Dec. 20, 1995 [KR] Rep. of Korea ............ 1995/52887
Apr. 20, 1996 [KR] Rep. of Korea ............ 1996/12113

[51] Int. Cl.$^6$ ............................................. G02B 1/53
[52] U.S. Cl. ............................ 359/270; 359/265; 359/273; 359/269
[58] Field of Search ............................ 359/265, 270, 359/273, 269

[56] References Cited

U.S. PATENT DOCUMENTS 5,172,151 12/1992 Yomogizawa et al. ............ 354/219

*Primary Examiner*—Frank G. Font
*Assistant Examiner*—Reginald A. Ratliff

[57] ABSTRACT

An electrochromic display device (ECD) for an optical pick-up apparatus which is capable of maximizing a transmissivity of a laser beam by forming a reflection prevention layer on the outer surfaces of transparent substrates, includes first and second transparent substrates formed at both sides of the ECD with a predetermined interval therebetween, first and second transparent electrodes coated on the inner surfaces of the transparent substrates, respectively, an electrochromic layer coated on the inner surface of the second transparent electrode so that colorizing or decolorizing may be carried out reversibly, a counter eletrode layer coated on the inner surface of the first transparent electrode, an electrolytic layer formed between the counter electrode layer and the electrochromic layer, and a reflection prevention layer coated to have more than one layer so as to prevent a beam from being reflected on the outer surfaces of the first and second transparent substrates.

20 Claims, 7 Drawing Sheets

ELECTROCHROMIC DISPLAY DEVICE FOR OPTICAL PICK UP APPARATUS

BACKGROUND OF THE INVENTION

1. Field of the Invention

The present invention relates to an optical pick up apparatus, and more particularly, to an electrochromic display device (hereinafter, called ECD) for an optical pick up apparatus which is capable of selectively recording or reading information on optical discs having each recording density and thickness by controlling a number of numerical apertures of an objective lens.

2. Description of the Prior Art

FIG. 1 is a view showing an optical system of an optical pick up apparatus according to the conventional art. As shown in this drawing, at a predetermined side is mounted a laser diode 1 for projecting a laser beam and in front of the laser diode 1 is provided a diffraction grating 2 for separating the laser beam projected from the laser diode 1 into a main beam and two sub-beam.

In front of the diffraction grating 2 is disposed a beam splitter 4 for transmitting or reflecting at a predetermined rate an incident light which has passed through the diffraction grating 2 and a light reflected from an optical disc 3, and in front of the beam splitter 4 is mounted an objective lens 5 for condensing the main beam and the sub-beam on the optical disc 3.

Between the beam splitter 4 and the objective lens 5 are provided a collimating lens 6 for making a beam which has passed through the diffraction grating 2 and the beam splitter 4 into a collimate light.

At one side of the beam splitter 4 is disposed a sensor lens 7 for condensing a beam reflected from the optical disc 3, passing through the objective lens 5 and the collimating lens 6 and then reflected from the beam splitter 4, and in front of the sensor lens is mounted a light detector 8 for detecting data signals of beams which have passed through the sensor lens 7.

The operation and problems of the optical pick up apparatus having the above construction according to the conventional art will now be described in detail above.

A beam projected from the laser diode 1 passes through the diffraction grating 2 and the beam splitter 4 to be converted into a collimate light through the collimating lens 6. Then, the light is condensed through the objective lens 5 and reflected or diffracted by the information recorded on the surface of the optical disc 3.

Then, the laser beam reflected from the surface of the optical disc 3 returns through the identical course to above step to be reflected on the beam splitter 4 and then passes through the sensor lens 7 to be detected by the optical detector 8.

A high density optical disc (0.6 mm) such as a digital video disc (hereinafter, called DVD) has a recording density six to eight times higher than a conventional compact disc (hereinafter, called CD). Therefore, to play the DVD, a number of numerical apertures (hereinafter, called NA) of the objective lens 5 must have a high value of about 0.6. Here, since a spherical aberration is increased as a thickness of the optical disc is increased, a thickness of the DVD is adopted to be 0.6 mm.

However, the following problems are caused when the high density optical disc such as the DVD having a thickness of 0.6 mm and the CD having a thickness of 1.2 mm is played according to the construction of FIG. 1.

When the high density optical disc (0.6 mm) is played by the objective lens (NA=0.6), the distribution of a laser beam strength is shown as a full line in FIG. 2, while the distribution of a laser beam strength is shown as a dotted line in FIG. 2 when the optical disc such as a CD (1.2 mm) is played by the objective lens (NA=0.6).

That is, a beam strength ratio of a main lobe with respect to a position is remarkably decreased, while a beam strength of a side lobe is relatively increased, resulting in increasing a crosstalk caused by the signals recorded on a neighboring track.

Consequently, since a spherical aberration with respect to the optical disc exists so as to play the 1.2 mm optical disc with the objective lens the NA of which is 0.6, the conventional optical pick up apparatus cannot disadvantageously play both the 1.2 mm optical disc such as a CD and the 0.6 mm optical disc such as DVD.

SUMMARY OF THE INVENTION

Accordingly, it is an object of the present invention to provide an ECD for an optical pick up apparatus which is capable of selectively recording or reading information on optical discs having respective recording density and thickness by controlling a number of numerical apertures of an objective lens.

To achieve the above object, there is provided an ECD for an optical pick up apparatus which includes first and second transparent substrates formed at both sides of the ECD with a predetermined interval therebetween, first and second transparent electrodes coated on inner surfaces of the transparent substrates, respectively, an electrochromic layer coated on the inner surface of the second transparent electrode so that colorizing or decolorizing may be carried out reversibly, a counter electrode layer coated on the inner surface of the first transparent electrode, an electrolytic layer formed between the counter electrode layer and the electrochromic layer and a reflection prevention layer coated to have more than one layer so as to prevent a beam from being reflected on outer surfaces of first and second transparent substrates.

BRIEF DESCRIPTION OF THE DRAWINGS

The present invention will become more fully understood from the detailed description given hereinbelow and the accompanying drawings which are given by way of illustration only, and thus are not limitative of the present invention, wherein:

FIGS. 5A and 5B show the cases in which the ECD in FIG. 4 is adopted in an optical disc such as a CD, wherein FIG. 5A is a view showing the condition in which the colorizing of the ECD has been performed and FIG. 5B is a view showing the condition that a beam is incident and transmitted to the colorized ECD;

6A is a view showing the condition in which the decolorizing of the ECD has been performed and FIG. 6B is a view showing the condition that a beam is incident and transmitted to the decolorized ECD;

DETAILED DESCRIPTION OF THE PREFERRED EMBODIMENTS

Figure 1:
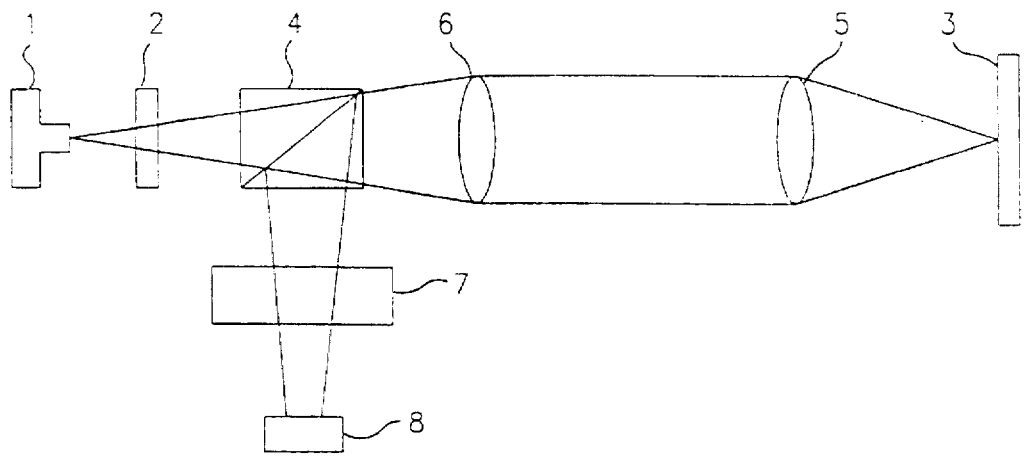
FIG. 1 is a view showing an optical system of an optical pick up apparatus according to the conventional art.
Figure 2:
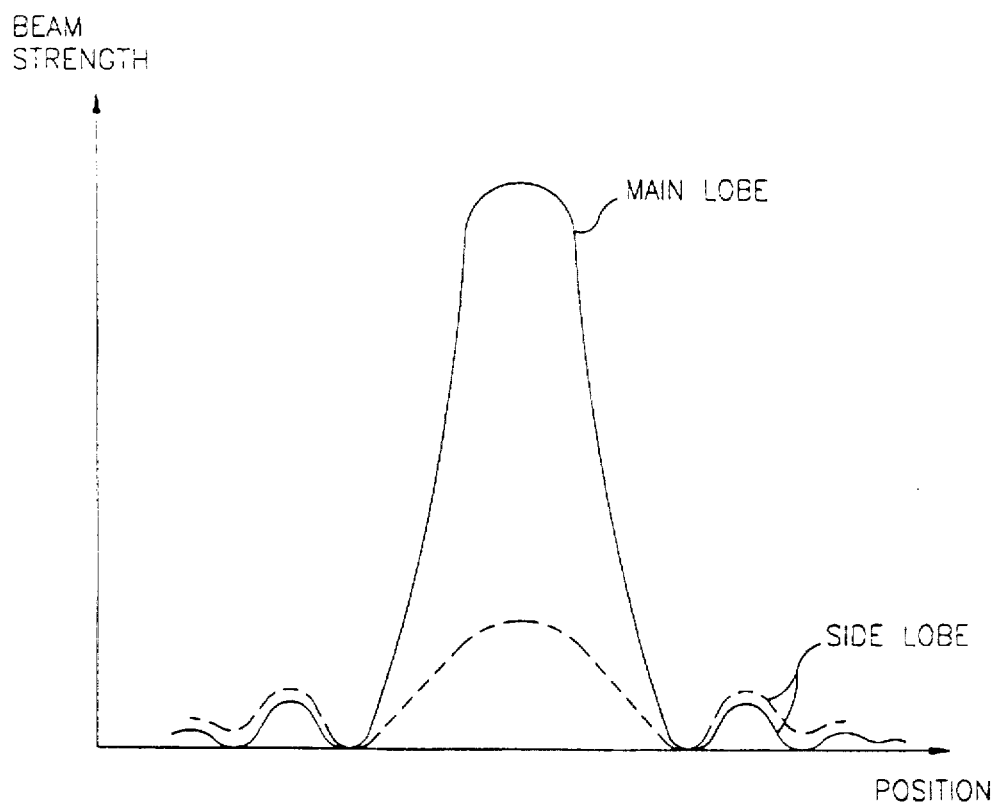
FIG. 2 is a distribution graph showing a beam strength reflected on an optical disc according to the operation of an optical pick up apparatus according to the conventional art.
Figure 3:
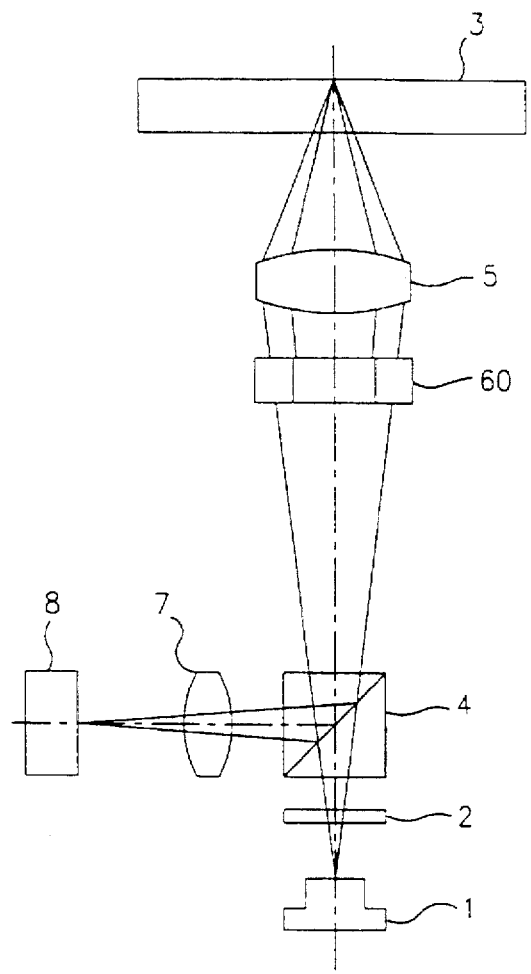
FIG. 3 is a view showing an optical system of an optical pick up apparatus according to the present invention.

FIG. 3 is a view showing an optical system of an optical pick up apparatus according to the present invention. As shown in this drawing, at a predetermined portion is mounted a laser diode 1 for projecting a laser beam and in front of the laser diode 1 is provided a diffraction grating 2 for separating the laser beam projected from the laser diode 1 into a main beam and two sub-beams.

In front of the diffraction grating 2 is disposed a beam splitter 4 for transmitting or reflecting at a predetermined rate an incident light which has passed through the diffraction grating 2 and a reflection light reflected from an optical disc 3, and in front of the beam splitter 4 is mounted an objective lens 5 for condensing the main beam and the sub-beam on the optical disc 3.

Between the beam splitter 4 and the objective lens 5 is mounted an ECD 60 for controlling a number of effective numerical aperture of the objective lens 5.

At one side of the beam splitter 4 is disposed a sensor lens 7 for condensing a beam reflected from the optical disc 3, passing through the objective lens 5 and the ECD 60 and then reflected from the beam splitter 4, and in front of the sensor lens 7 is mounted a light detector 8 for detecting data signals of beams which have passed through the sensor lens 7.

As described above, identical numerals are put to the elements identical to those in the conventional art.

Particularly, the ECD 60 utilizes a reversible color change of a material caused by the operation of a voltage or an electric current, and the first embodiment was fabricated by D. K. DEB in 1661 using a tungsten oxide ($WO_3$) thin film, and presently, is adopted in an optical apparatus.

Figure 4:
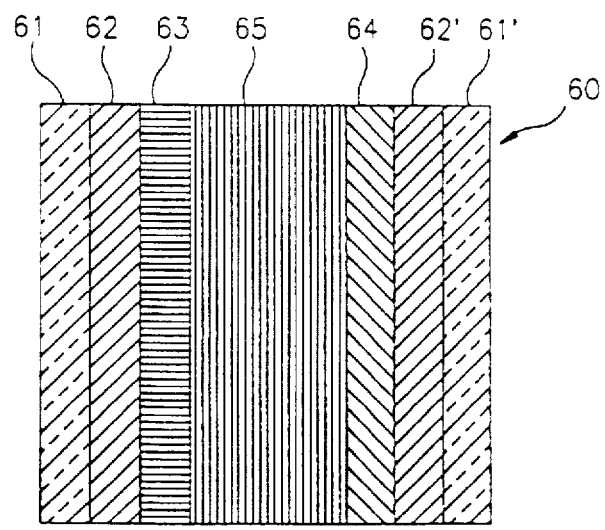
FIG. 4 is a cross-sectional view showing a basic construction of an ECD according to a first embodiment of the present invention.

With reference to FIG. 4, each element of the ECD 60 according to the present invention will now be described in detail.

At both sides of the ECD 60, transparent substrates 61,61' are formed with a predetermined interval therebetween, and transparent electrodes 62,62' are coated on each inner side of the transparent substrates 61,61'.

On an inner surface of the transparent electrode 62' is coated an electrochromic layer 64 so that the colorizing and decolorizing can be carried reversibly, and a counter electrode layer 63 is coated on an inner surface of the transparent electrode 62.

Between the electrochromic layer 64 and the counter electrode layer 63 is formed an electrolytic layer 65 composed of $H^+,Li^+$ and $Na^+$.

On the transparent electrode 62', an electrode pattern (not illustrated) is formed to have a predetermined diameter.

A representative material for the electrochromic layer 64 is a tungsten oxide ($WO_3$), and generally, an amorphous body (a-$WO_3$) which is obtained from a vapor deposition method is used.

The tungsten oxide ($WO_3$) is developed according to the following reaction in the reduction of the material ($WO_3$).

$$WO_3 + xe^- + xM^+ \rightarrow M_xWO_3$$

Here, H, Li, Na or Ag are used as a material(M) and $SiO_2$, $Cr_2O_3$, $Ta_2O_5$ is used as an $M^+$ ion source. An acid which has a satisfactory response characteristic is used as an electrolytic material, but since an occurrence of a solution of a-$WO_3$ shortens a life span of the device, an organic electrolytic material such as $LiClO_4$+Prophylene carbonate is employed.

The operation of the optical pick up apparatus having the above construction according to the present invention will now be described in detail with reference to FIG. 3.

First, a beam projected from the laser diode 1 is incident on the diffraction grating 2 and separated into a main beam and a sub-beam, and the separated beams passes through the beam splitter 4 located in front. The beam which has passed the beam splitter 4 passes through the ECD 60, so that a number of the effective numerical apertures can be controlled, and then condensed on the optical disc 3 through the objective lens 5.

Then, the beam reflected from the optical disc 3 passes through the objective lens 5 and the ECD 60 to be reflected on the beam splitter 4. The reflected beam is condensed by the sensor lens 7 and then a data signal is detected in the light detector 8.

Figure 5A:
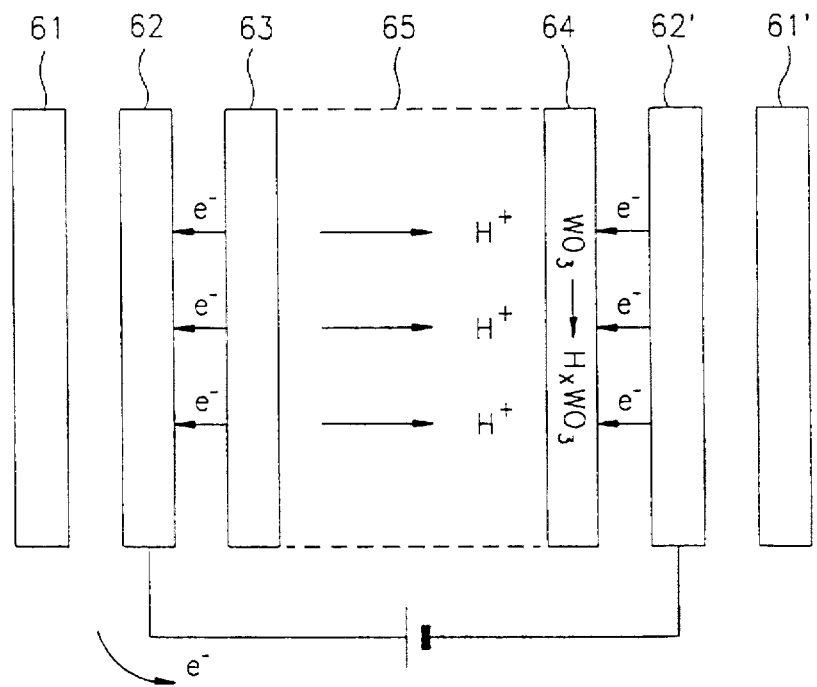
Figure 5B:
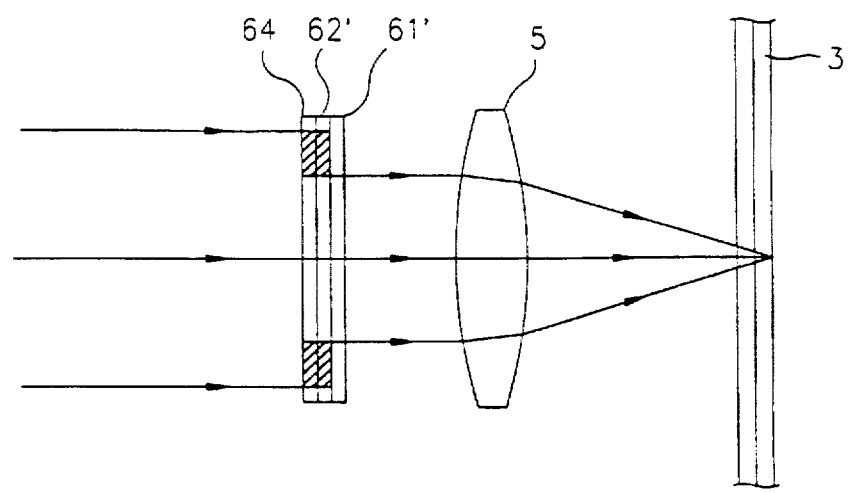
Figure 6A:
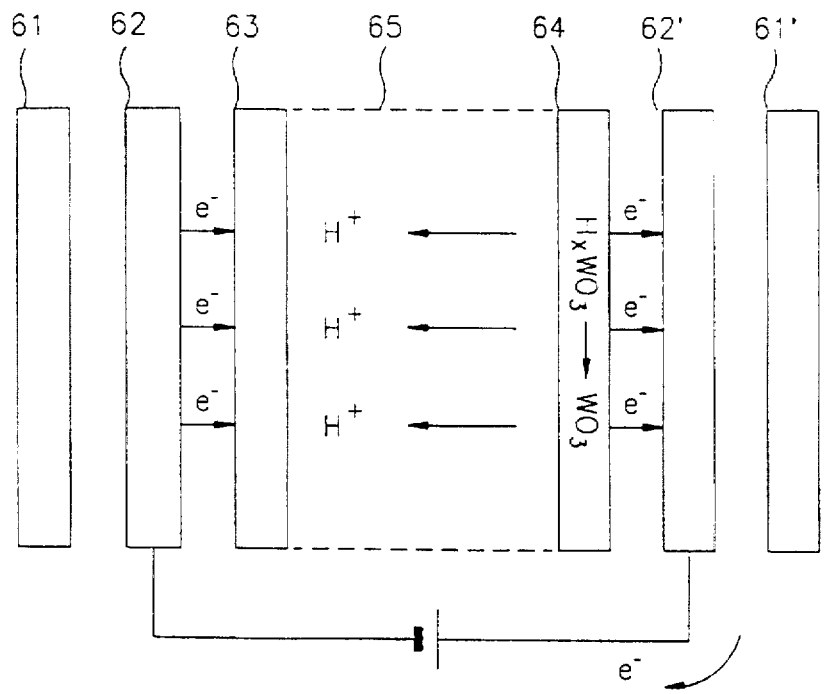
FIGS. 6A and 6B show the cases in which the ECD in FIG. 4 is adopted in an optical disc for DVD, wherein FIG.
Figure 6B:
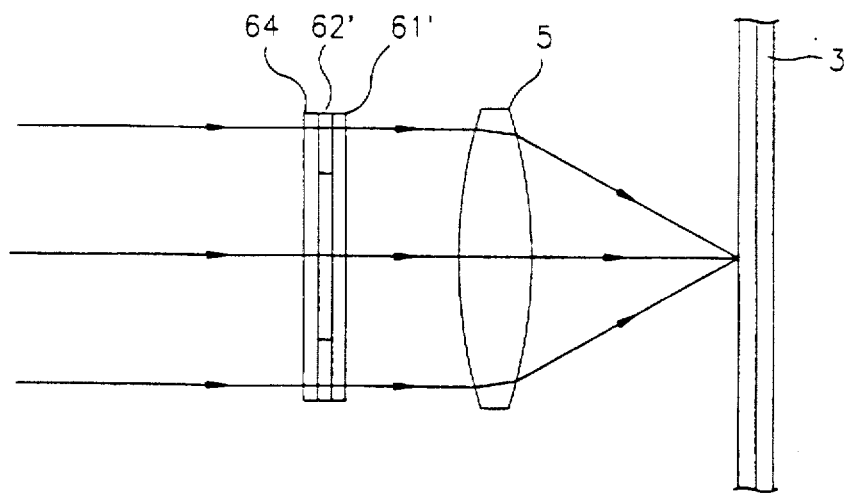

Next, with reference to FIGS. 5 and 6, the operation of the ECD 60 will now be described when information is recorded and read on the optical disc such as a CD or a DVD.

First, description of the case where the ECD 60 is adopted in the optical disc such as a CD will be given with reference to FIG. 5.

When a negative electrode (−) is applied to one transparent electrode 62' and a positive electrode (+) to the other transparent electrode 62, the following reaction occurs on the electrochromic layer 64.

$$WO_3 + xe^- + xH^+ \rightarrow H_xWO_3$$

As shown in the above formula, by combining a plurality of $H^+$ with $WO_3$, the portion of the electrochromic layer 64 contact with the transparent electrode 62' is colorized to be blue and the other portions not contact with the transparent electrode 62' is not colorized.

That is, of the beams incident on the ECD 60 after passing through the beam splitter 4, the beam incident on the colorized portion is not transmitted and the beam incident on the other portions is transmitted.

As the transmitted beam is incident on the objective lens 5, a diameter of a luminous flux is reduced, and accordingly, a number of numerical apertures is increased, and the spherical aberration is decreased.

Next, description of the case where the ECD 60 is adopted in the optical disc such as a DVD will be given with reference to FIG. 6.

First, if the arrangement of voltage of the case the ECD 60 is adopted in the optical disck such as a CD is reversed, that is, if a positive electrode (+) is applied to one transparent electrode 62' and a negative electrode (−) to the other transparent electrode 62, the following reaction occurs on the electrochromic layer 64.

That is, as the electrochromic layer 64 colorized to be blue, all the beams incident on the ECD 60 after passing through the beam splitter 4 are transmitted and condensed on the objective lens 5.

Using the above principle, information can be read or recorded on the optical disc such as a CD or a DVD.

Description of the ECD 60 of the optical pick up apparatus according to a second embodiment of the present invention will now be given with reference to FIGS. 7 and 8.

Figure 7:
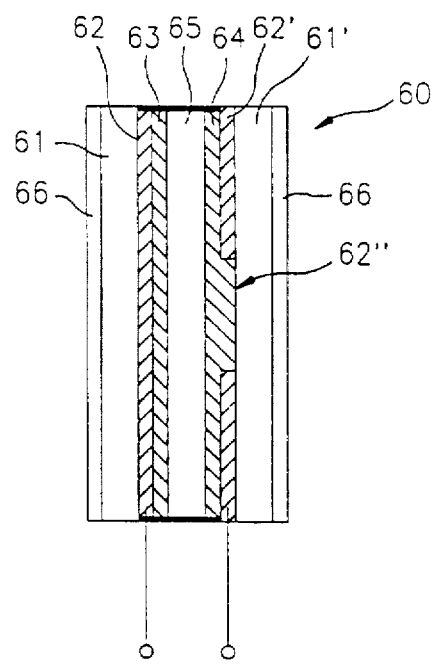
FIG. 7 is a cross-sectional view showing a basic construction of an ECD according to a second embodiment of the present invention.
Figure 8:
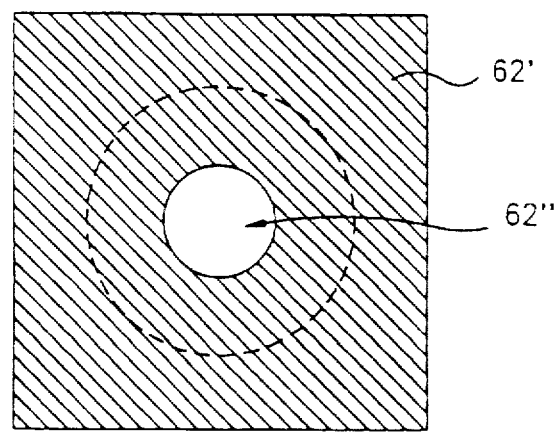
FIG. 8 is a cross-sectional view showing a partial transmission region in FIG. 7.

FIG. 7 is a cross-sectional view showing a basic construction of an ECD according to a second embodiment of the present invention, and FIG. 8 is a cross-sectional view showing a partial transmission region 62" in FIG. 7. As shown in these drawings, in the ECD 60, transparent substrates 61,61' are formed at both ends with a predetermined interval therebetween, and transparent electrode 62,62' are formed on inner surfaces of the transparent substrates 61,61', respectively.

The counter electrode layer 63 is formed on an inner surface of the transparent electrode 62, and the electrochromic layer 64 is formed on an inner surface of the transparent electrode 62'.

The electrolytic layer 65 is formed between the counter electrode layer 63 and the electrochromic layer 64, and at a central portion of the transparent electrode 62', the partial transmission region 62" is formed to be circular in such a manner that the region 62" may not be contact with the electrochromic layer 64.

The other regions of the transparent electrode 62' except the partial transmission region 62" are contact with the electrochromic layer 64.

A reflection prevention layer 66 is coated on the outer surfaces of the transparent substrates 61,61', and the layer 66 has the following characteristic according to the result of the experiment:

The reflection prevention layer 66:
an optical thickness nd=λ/4 (1.2<n<$n_g$),
wherein 'd' represents a thickness of the reflection prevention layer, 'λ' a wave length of an incident beam, 'n' a refractive index of the reflection prevention layer, and '$n_g$' a refractive index of the transparent substrate.

The reflection prevention layer 66 can be formed only on one transparent substrate 61 or 61' depending on the usage or the purpose.

Figure 9:
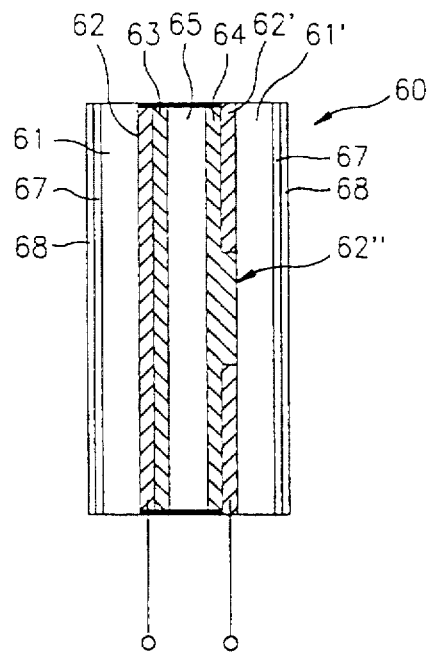
FIG. 9 is a cross-sectional view showing a basic construction of an ECD according to a third embodiment of the present invention.

FIG. 9 is a cross-sectional view showing a basic construction of an ECD according to a third embodiment of the present invention, in which another reflection prevention layer is provided in the ECD 60 in FIG. 7.

That is, first and second reflection prevention layers 67,68 are coated on the outer surfaces of the transparent substrates 61,61', respectively, wherein the layers 67,68 have the following characteristic according to the result of the experiment:

The first reflection prevention layer 67:
an optical thickness $n_1 d_1$=λ/4 ($n_g$<$n_1$<2.0)
The second reflection prevention layer 68:
an optical thickness $n_2 d_2$=λ/4 (1.2<$n_2$<$n_g$), wherein '$d_1$' and '$d_2$' represent a thickness of the first and second reflection prevention layers, 'λ' a wave length of an incident beam, '$n_1$' and '$n_2$' a refractive index of the first and second reflection prevention layers, and '$n_g$' a refractive index of the transparent substrate.

The first and second reflection prevention layers 67,68 also can be formed only on one transparent substrate 61 or 61' depending on the usage or the purpose.

Figure 10:
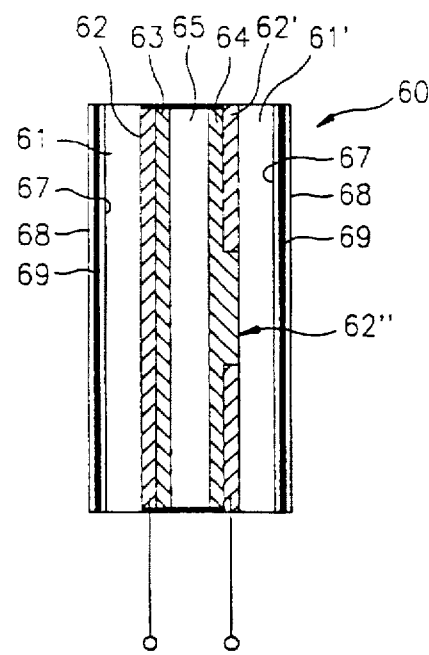
FIG. 10 is a cross-sectional view showing a basic construction of an ECD according to a fourth embodiment of the present invention.

FIG. 10 is a cross-sectional view showing another embodiment of FIG. 7, wherein two more reflection prevention layers are provided in the ECD 60 in FIG. 7.

That is, the first reflection prevention layers 67 are respectively formed on the outer surfaces of the transparent substrates 61,61', intermediate reflection prevention layers 69 are respectively formed on the outer surfaces of the first reflection prevention layer 67, and the second reflection prevention layers 68 are respectively formed on the outer surfaces of the intermediate reflection prevention layers 69, wherein the layers 67,68 and 69 have the following characteristic according to the result of the experiment:

The first reflection prevention layer 67:
an optical thickness $n_1 d_1$=λ/4 ($n_g$<$n_1$<2.0)
The intermediate reflection prevention layer 69:
an optical thickness $n_H d_H$=λ/4 ($n_1$<$n_H$<2.4)
The second reflection prevention layer 68:
an optical thickness $n_2 d_2$=λ/4 (1.2<$n_2$<$n_g$), wherein '$d_1$' and '$d_2$' represent a thickness of the first and second reflection prevention layers, 'λ' a wave length of an incident beam, '$n_1$' and '$n_2$' a refractive index of the first and second reflection prevention layers, '$n_g$' a refractive index of the transparent substrate, '$d_H$' a thickness of the intermediate reflection prevention layer, and '$n_H$' a refractive index of the intermediate reflection prevention layer.

As described above, a number of the reflection prevention layers and the forming location thereof are not limitative of the embodiments of the present invention, and can have various modifications.

On outer surfaces of the reflection prevention layers 66,68 in each embodiment, an incidence prevention layer 70 is formed so as to limit the maximum range of the diameter of the luminous flux transmitted to the objective lens 5.

The operation and effect of the ECD 60 of the optical pick up apparatus according to the embodiments of the present invention will now be described in detail.

First, an ion is generated from the counter electrode layer 63 if a negative electrode is applied to the transparent electrode 62' and a positive electrode to the transparent electrode 62, so as to read or record information on the optical disc such as a CD.

Then, the generated ion is transmitted to the electrochromic layer 64 through the electrolytic layer 65, and the electrochromic layer 64 takes in the ion to gain a predetermined color.

That is, a predetermined portion of the electrochromic layer 64 contact with the transparent electrode 62' is colorized so as to prevent the transmission of an incident beam, which is transmitted through the partial transmission region 62".

A reflectivity of the beam generated by the difference of the refractive index generated when the beam is incident on the transparent substrate 61 from air or the difference of the refractive index generated when the beam is projected to air from the transparent substrate 61' is minimized by the reflection prevention layer.

Figure 11:
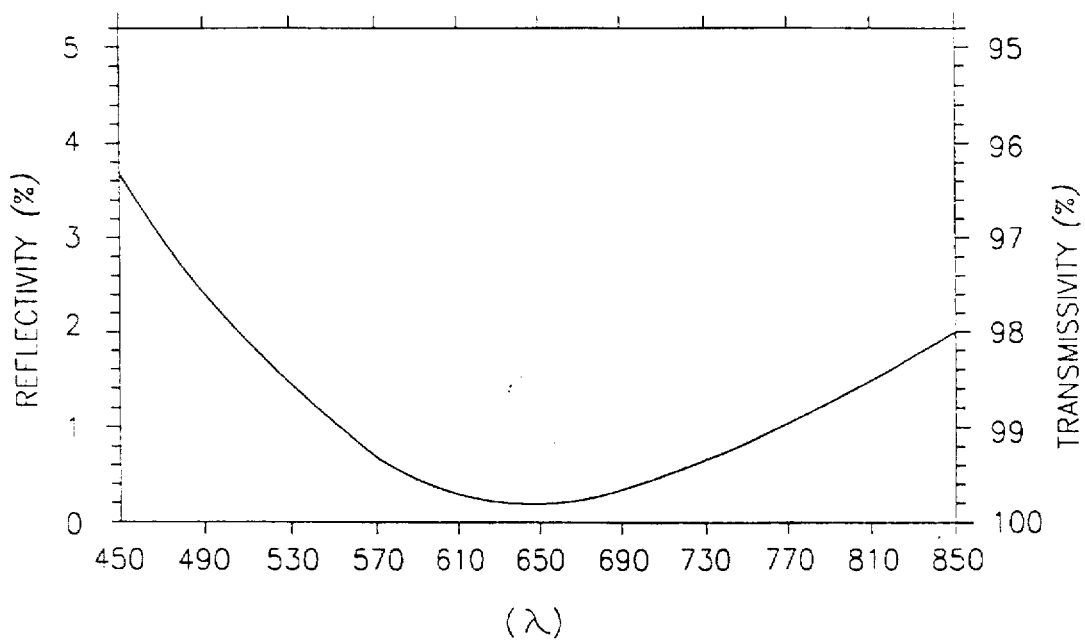
FIG. 11 is a graph showing a reflectivity and a transmissivity of an ECD in FIG. 7.
Figure 12:
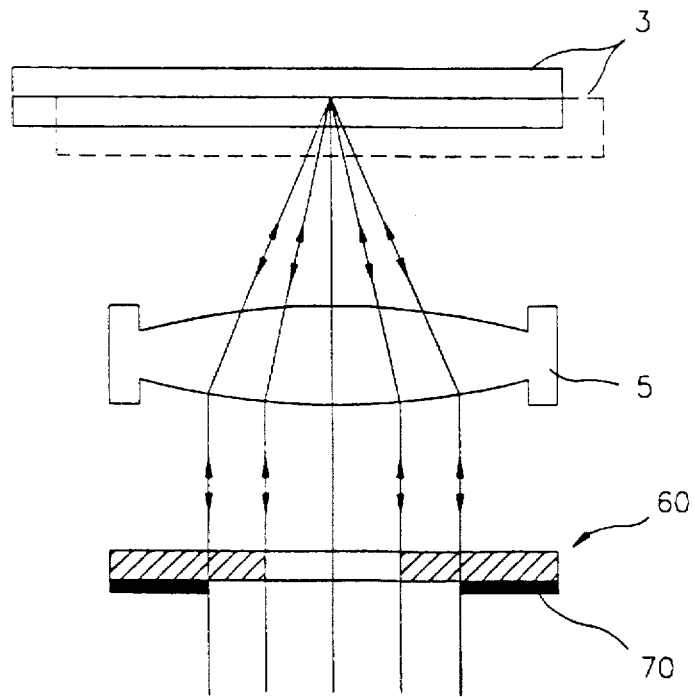
FIG. 12 is a view showing an operation of an ECD on which a reflection prevention layer according to the present invention is formed.

That is, as shown in FIG. 11, it can be seen that when the wave length of a beam is 635±15 nm, the reflectivity approaches close to 0.2%, and with the reflectivity decreased, the transmissivity is improved.

The thickness of the reflection prevention layer can be determined by using the characteristic of each stop layer according to each result of the experiments. For example, when the wave length of a beam is set to be 635±15 nm and the material for the first reflection prevention layer 67 is set to be $AL_2O_3$, the refractive index of $AL_2O_3$ is 1.63, and therefore, using the characteristic of the first reflection prevention layer 67 that the optical thickness $(n_1d_1)$ is obtained by the equation of $n_1d_1=\lambda/4$ ($n_g<n_1<2.0$), when the actual thickness of the first reflection prevention layer 67 is about 620 nm, the transmissitvity is the most proper.

When the wave length of a beam is set to be 635±15 nm and the material for the second reflection prevention layer 68 is set to be $MgF_2$, the refractive index of $MgF_2$ is 1.38, and therefore, using the characteristic of the second reflection prevention layer 68 that the optical thickness$(n_2d_2)$ is obtained by the equation of $n_2d_2=\lambda/4$ ($1.2<n_2<n_g$), when the actual thickness of the second reflection prevention layer 68 is about 645 nm, the transmissitvity is the most proper.

That is, as the diameter of a luminous flux is decreased, a number of the numerical apertures are increased, but a spherical aberration is decreased due to the increase of a number of the numerical apertures, and as a result, a noise caused by a light signal is eliminated, which can be seen through the following equation:

A number of numerical apertures:

$NA \equiv n \sin\theta$ (n:refraction ratio, θ:incidence angle

A diameter of a luminous flux : $\phi = K \lambda/NA$

A spherical aberration : $SA = \Delta t/NA^4$

So as to record or read information on the optical disc such as a DVD while using the optical disc such as a CD, the conversion can be made by applying a positive electrode (+) to the transparent electrode 62' and a negative electrode (−) to the transparent electrode 62.

Here, the reflection prevention layer prevents a reflectivity generated by the difference of the refractive index, and thereby a high transmissivity can be achieved.

As described in detail above, the performance of an optical pick up apparatus can be effectively enhanced by reading or recording information on an optical disc such as a CD or a DVD, using the ECD in which a reversible color variation is made by the operation of a voltage.

Further, the operational characteristic of the product can be improved by forming a reflection prevention layer on the ECD and increasing a transmissivity of a beam.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. An electrochromic device (ECD) for an optical pick-up apparatus, comprising:

first and second transparent substrates disposed with a predetermined interval therebetween;

first and second transparent electrodes formed on inner surfaces of the first and second transparent substrates;

an electrochromic layer formed on an inner surface of the second transparent electrode;

a counter electrode layer formed on an inner surface of the first transparent electrode; and an electrolytic layer formed between the counter electrode layer and the electrochromic layer.

2. A device for an optical pick-up apparatus, comprising:

first and second transparent substrates disposed with a predetermined interval therebetween;

first and second transparent electrodes formed on inner surfaces of the first and second transparent substrates;

a counter electrode layer formed on the inner surface of the first transparent electrode;

an electrochromic layer formed on the inner surface of the second transparent electrode;

an electrolytic layer formed between the counter electrode layer and the electrochromic layer; and a reflection prevention layer formed on at least one of the first and second transparent substrates.

3. The device of claim 2, wherein in the reflection prevention layer, the optimum optical thickness (nd) is obtained by the equation of $nd=\lambda/4$ in which the refractive index (n) ranges from 1.2 to $n_g$, wherein 'd' represents a thickness of the reflection prevention layer, 'λ' represents a refractive index of the reflection prevention layer, and '$n_g$' represents a refractive index of at least one of the first and second transparent substrates.

4. The device of claim 2, wherein the reflection prevention layer comprises:

a first reflection prevention layer whose optimum optical thickness $(n_1d_1)$ is obtained by the equation of $n_1d_1=\lambda/4$ in which the refractive index $(n_1)$ ranges from $n_g$ to 2.0; and a second reflection prevention layer whose optimum optical thickness $(n_2d_2)$ is obtained by the equation of $n_2d_2=\lambda/4$ in which the refractive index $(n_2)$ ranges from 1.2 to $n_g$, wherein '$d_1$' and '$d_2$' represent thicknesses of the first and second reflection prevention layers, respectively, 'λ' represents a wavelength of an incident beam, '$n_1$' and '$n_2$' represent refractive indices of the first and second reflection prevention layers, respectively, and '$n_g$' represents a refractive index of at least one of the first and second transparent substrates.

5. The device of claim 2, wherein the reflection prevention layer comprises:

a first reflection prevention layer whose optimum optical thickness $(n_1d_1)$ is obtained by the equation of $n_1d_1=\lambda/4$ in which the refractive index $(n_1)$ ranges from $n_g$ to 2.0;

an intermediate reflection prevention layer whose optimum optical thickness $(n_Hd_H)$ is obtained by the equation of $n_Hd_H=\lambda/4$ in which the refractive index $(n_H)$ ranges from $n_1$ to 2.4;

a second reflection prevention layer whose optimum optical thickness $(n_2d_2)$ is obtained by the equation of $n_2d_2=\lambda/4$ in which the refractive index $(n_2)$ ranges from 1.2 to $n_g$, wherein '$d_1$' and '$d_2$' represent thicknesses of the first and second reflection prevention layers, respectively, 'λ' represents a wavelength of an incident beam, '$n_1$' and '$n_2$' represent refractive indices of the first and second reflection prevention layers, respectively, '$n_g$' represents a refractive index of at least one of the first and second transparent substrates, '$d_H$' represents a thickness of the intermediate reflection prevention layer, and '$n_H$' represents a refractive index of the intermediate reflection prevention layer.

6. The device of claim 2, wherein the reflection prevention layer is formed on one side of the second transparent substrate.

7. The device of claim 2, further comprising:

an incidence prevention layer formed on the outer surface of the reflection prevention layer, so as to limit the maximum range of the diameter of a luminous flux.

8. The device of claim 2, wherein the electrochromic layer is composed of tungsten oxide ($WO_3$).

9. The device of claim 1, wherein a voltage is selectively applied to the first and second transparent electrodes to provide a colorized portion and a decolorized portion in the electrochromic layer.

10. The device of claim 1, wherein the electrochromic layer includes tungsten oxide ($WO_3$).

11. The device of claim 1, wherein the electrolytic layer is formed with $H^+$, $Li^+$ and $Na^+$.

12. The device of claim 1, further comprising:

at least one reflection prevention layer formed on at least one of the first and second transparent substrates.

13. The device of claim 12, further comprising:

an incidence prevention layer formed on the outer surface of the at least one reflection prevention layer.

14. The device of claim 1, wherein the optical pick-up apparatus includes:

a light source for generating a laser beam, a diffraction member for diffracting the laser beam from the light source, a beam splitter formed in front of the diffraction member, an objective lens for focusing the laser beam from the beam splitter onto an optical disc, wherein the ECD is disposed between the beam splitter and the objective lens, and a photodetector for detecting a reflective beam from an optical disc.

15. A device for an optical pick-up apparatus, comprising:

first and second transparent substrates disposed with a predetermined distance therebetween;

first and second transparent electrodes formed on inner surfaces of the first and second transparent substrates;

a colorizable layer formed on an inner surface of the second transparent substrate;

a counter electrode layer formed on an inner surface of the first transparent electrode; and an electrolytic layer formed between the counter electrode layer and the colorizable layer.

16. The device of claim 15, wherein portions of the colorizable layer are colorized according to a voltage applied to the first and second transparent electrodes.

17. The device of claim 15, wherein when a positive electrode is applied to the second transparent electrode and a negative electrode is applied to the first transparent electrode, the entire colorizable layer is colorized for transmission of a beam therethrough.

18. The device of claim 15, further comprising:

at least one reflection prevention layer formed on at least one of the first and second transparent substrates.

19. The device of claim 18, further comprising:

an incidence prevention layer formed on an outer surface of the reflection prevention layer.

20. The device of claim 15, wherein the colorizable layer includes tungsten oxide ($WO_3$).

* * * * *